US009359178B2

(12) United States Patent
Arai et al.

(10) Patent No.: US 9,359,178 B2
(45) Date of Patent: Jun. 7, 2016

(54) DETECTOR FOR ELECTROMAGNETIC BRAKE

(75) Inventors: Hideki Arai, Chiba-Prefecture (JP); Yasunobu Uchino, Narita (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 66 days.

(21) Appl. No.: 13/505,145

(22) PCT Filed: Feb. 18, 2010

(86) PCT No.: PCT/IB2010/000307
§ 371 (c)(1), (2), (4) Date: Apr. 30, 2012

(87) PCT Pub. No.: WO2011/098850
PCT Pub. Date: Aug. 18, 2011

(65) Prior Publication Data

US 2012/0217102 A1 Aug. 30, 2012

(30) Foreign Application Priority Data

Dec. 9, 2009 (JP) ................................ 2009-279077

(51) Int. Cl.
*F16D 59/02* (2006.01)
*B66D 5/30* (2006.01)
*B66D 5/08* (2006.01)

(52) U.S. Cl.
CPC ... *B66D 5/30* (2013.01); *B66D 5/08* (2013.01)

(58) Field of Classification Search
CPC ............ B66D 5/08; B66D 5/30; F16D 59/02; F16D 2066/021; F16D 2066/022; F16D 2066/025; F16D 2066/005
USPC ...... 188/1.11 R, 1.11 W, 1.11 L, 1.11 E, 171, 188/173
See application file for complete search history.

(56) References Cited

U.S. PATENT DOCUMENTS 4,568,909 A * 2/1986 Whynacht ..................... 187/393
5,337,878 A * 8/1994 Mehlert et al. ................ 198/323
(Continued)

FOREIGN PATENT DOCUMENTS

CN 201059327 Y 5/2008
CN 101264840 A 9/2008
(Continued)

OTHER PUBLICATIONS

Craig McIntyre, Safety Under Pressure-Sensor Considerations in a safety instrumented system, ISA.org, Published Jun. 1, 2005.
Office Action mailed Dec. 23, 2013 in corresponding Great Britain Application No. GB 1211405.4.

*Primary Examiner* — Bradley King
(74) *Attorney, Agent, or Firm* — Cantor Colburn LLP

(57) ABSTRACT

A detector for an electromagnetic brake, for example used in an elevator system, that, by quantitative judgment, determines whether the brake force of the electromagnetic brake is appropriate. Load cells for detecting the recovery forces of brake springs are arranged between brake springs, which energize brake arms with brake shoes installed on them toward the side of brake wheel, and spring sheets, which hold brake springs in a compressive deformed state, and, at the same time, judgment part judges whether the brake force of electromagnetic brake 4 is outside a prescribed normal range based on the outputs of load cells. If the brake force of electromagnetic brake is outside the normal range, judgment part sends a signal, for example to a monitoring center.

10 Claims, 3 Drawing Sheets

(56) References Cited

U.S. PATENT DOCUMENTS

| | | | | | |
|---|---|---|---|---|---|
| 5,339,069 | A * | 8/1994 | Penner et al. | 340/454 |
| 5,848,672 | A * | 12/1998 | Brearley et al. | 188/1.11 L |
| 6,478,124 | B2 * | 11/2002 | Cholinski | 188/171 |
| 6,520,299 | B2 * | 2/2003 | Rimann et al. | 188/171 |
| 6,722,477 | B1 * | 4/2004 | Wolfsteiner et al. | 188/72.9 |
| 6,847,869 | B2 * | 1/2005 | Dewberry et al. | 701/33.9 |
| 7,475,122 | B2 * | 1/2009 | Azpitarte | 709/217 |
| 8,104,589 | B2 * | 1/2012 | Ollat et al. | 188/72.6 |
| 2003/0111306 | A1 | 6/2003 | Watanabe et al. | |
| 2004/0079591 | A1 * | 4/2004 | Mueller | 187/287 |
| 2009/0084637 | A1 * | 4/2009 | Bailey et al. | 188/1.11 E |

FOREIGN PATENT DOCUMENTS

| | | | |
|---|---|---|---|
| CN | 201288041 | Y | 8/2009 |
| EP | 0661231 | A1 | 12/1994 |
| GB | 2488504 | | 8/2012 |
| JP | 03012873 | U | 2/1991 |
| JP | 2002316777 | A | 10/2002 |
| JP | 2004/123270 | A | 4/2004 |
| JP | 2005/194056 | A | 7/2005 |
| KR | 2000/0050895 | A | 8/2000 |

* cited by examiner

DETECTOR FOR ELECTROMAGNETIC BRAKE

CROSS-REFERENCE TO RELATED APPLICATIONS

This application is a U.S. national stage filing under 35 USC §371 of International Patent Application No. PCT/IB2010/000307, filed on Feb. 18, 2010, which claims priority under 35 USC §119 and the Paris Convention to Japanese Patent Application No. 2009-279077 filed on Dec. 9, 2009.

FIELD OF THE DISCLOSURE

1. Technical Field

The present invention pertains to a detector for an electromagnetic brake, such as those used in an elevator system.

2. Background of the Disclosure

Japanese Unexamined Patent Application No. 10-279216, for example, describes an electromagnetic brake arranged on the hoist of an elevator. The brake assembly includes a brake pulley connected to the motor of the hoist, a brake lever that presses the brake pulley, an electrical contact member arranged in the lining portion of the brake lever and in direct contact with the brake pulley, and a detector for detecting contact between the electrical contact member and the brake pulley. When the motor of the hoist is turned on, if the system judges that the lining portion of the brake lever is in contact with the brake pulley, an OFF signal is output to the motor to prevent rotation of the brake pulley while the lining portion of the brake lever is in contact with it.

TECHNICAL PROBLEM

Although the brake lever is energized in the direction to press the brake pulley under a recovery force based on compressive deformation of the brake spring, when the lining portion of the brake lever is worn out, the compressive deformation quantity of the brake spring in the braking operation decreases correspondingly, and the recovery force of the brake spring decreases, so the brake force of the electromagnetic brake decreases.

According to the technology described in the reference described above, it is possible to detect whether the lining portion of the brake lever is in contact with the brake pulley. However, a quantitative judgment on whether the brake force of the electromagnetic brake is appropriate is impossible.

SUMMARY OF THE DISCLOSURE

The objective of the present invention is to solve the aforementioned problems of the prior art by providing a detector of an abnormality of an electromagnetic brake in an elevator characterized by the fact that it can quantitatively determine whether the brake force of the electromagnetic brake is appropriate, so the level of safety can be improved.

In one possible embodiment, the invention is a detector for an electromagnetic brake while a brake force is generated by pressing a brake piece on a member for braking with the recovery force based on the elastic deformation of the brake spring, the brake piece is driven away from the member for braking against the recovery force of the brake spring by means of an electromagnetic attracting force caused by excitation of a solenoid so the brake force is released. The detector can be a load sensor that detects the recovery force of the brake spring, and a judgment device that makes a comparison of the output of the load sensor with at least one of a brake force lower limit or brake force upper limit, and generates a signal indicative of the comparison.

That is, according to one possible embodiment of the invention, the judgment means quantitatively judges whether the brake force of the electromagnetic brake is appropriate based on the recovery force of the brake spring.

According to one possible embodiment of the present invention, whether the brake force of the electromagnetic brake is appropriate can be quantitatively judged based on the recovery force detected with the load sensor.

According to one possible embodiment, the present invention can detect issues with the brake earlier.

DETAILED DESCRIPTION OF THE DISCLOSURE

Figure 1:
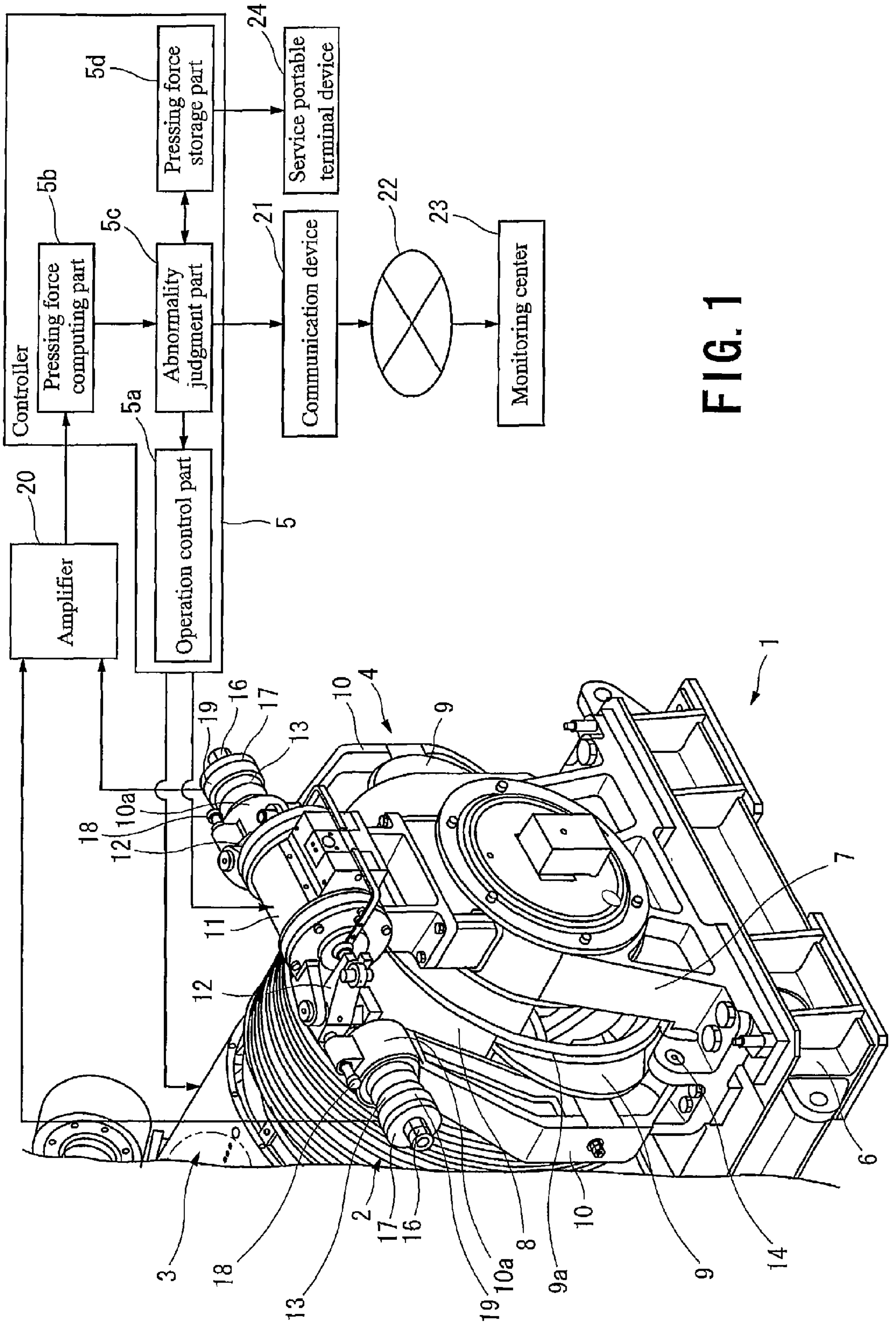
FIG. 1 is a diagram illustrating a detector for an electromagnetic brake in an elevator in one possible embodiment of the present invention.

FIG. 1 shows a detector for an electromagnetic brake in the hoist of an elevator of a so-called traction system.

Hoist 1 shown in FIG. 1 has main traction sheave 2 that engages a main rope (not shown in the figure), motor 3 that drives main sheave 2, and electromagnetic brake 4 that brakes main sheave 2. Based on an instruction from controller 5, motor 3 drives main sheave 2 to rotate, so that an elevator car (not shown in the figure) is lifted.

As one example, electromagnetic brake 4 can have the following parts: frame 7 arranged on mechanical table 6 that supports hoist 1, brake wheel 8 as the member for braking, which is connected along with main sheave 2 to a driving shaft (not shown in the figure) of motor 3, and which is driven to rotate together with the main sheave 2, a pair of brake arms 10 installed on brake shoes 9 as brake pieces arranged facing each other on the two sides of brake wheel 8 in the radial direction, solenoid unit 11 arranged between the upper end portions of the two brake arms 10, a pair of brake levers 12 arranged between the solenoid unit 11 and each of the two brake arms 10, respectively, and a pair of brake springs 13 that energize the two brake arms 10 toward the side of brake wheel 8, respectively. The present invention could be utilized on other types of electromagnetic brakes.

Figure 2:
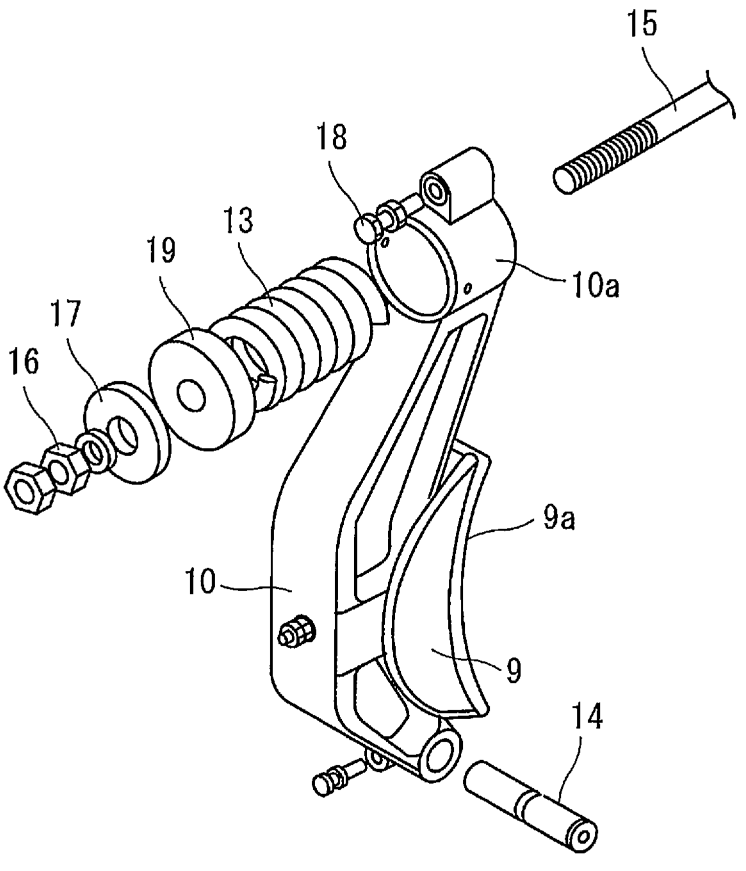
FIG. 2 is an exploded oblique view illustrating the main parts of the electromagnetic brake shown in FIG. 1.

FIG. 2 is an exploded oblique view illustrating the main portion of electromagnetic brake 4. In FIG. 2, as a typical example of the two brake arms 10, only left side brake arm 10 in FIG. 1 is shown. The same constitution is adopted for right side brake arm 10 in FIG. 1.

In addition to FIG. 1, as shown in FIG. 2, the lower end portions of both brake arms 10 have pins 14 and are connected to frame 7. They can be rocked toward/away from brake wheel 8. On the other hand, on the upper end portions of both brake arms 10, cup-shaped spring receptacle portions **10*a* opening toward the side of counter [sic] solenoid unit 11 are formed. In spring receptacle portions 10*a* of both brake arms 10, the ends on one side of two brake springs 13** are inserted, respectively.

The two brake springs 13 are so-called compressive coil springs. The left and right rods 15 connected to frame 7, are inserted through the inner peripheral side of the respective brake springs 13. Two brake springs 13 are held in a compressed deformed state by means of spring sheets 17 as spring holding members engaged by nuts 16 at the tips of the two rods 15, respectively. That is, the energizing forces of two brake springs 13 work in the direction to move two brake arms 10 toward each other.

In an intermediate portion in the up/down direction of the two brake arms 10, brake shoes 9 with attached linings 9*a* are respectively installed. The linings 9*a* of the two brake shoes 9 press the outer peripheral surface of brake wheel 8 with recovery forces due to the compressive deformation of the two brake springs 13, so that brake wheel 8 is braked.

On the other hand, when the brake is released, controller 5 controls to excite solenoid unit 11. As a result, the two brake shoes 9 are driven against the energizing forces of two brake springs 13 away from brake wheel 8. More specifically, one end of each of the two brake levers 12 makes contact with the upper end of each of two brake arms 10 via adjusting screw 18, and, by means of an electromagnetic attracting force due to excitation of solenoid unit 11, the other end of each of brake levers 12 is attracted toward the side of the solenoid unit 11, so that two brake arms 10 are rocked away from each other, and the brake force is released.

Also, load cells 19 as load sensors for detecting compressive loads are respectively arranged between two brake springs 13 and two spring sheets 17. The two load cells 19 are for quantitative detection of the recovery forces of two brake springs 13, and the outputs of the two load cells 19 are sent via amplifier 20 to controller 5. Also, in this embodiment, two load cells 19 are respectively arranged between two brake springs 13 and two spring sheets 17. Other arrangements are possible. For example, one may also adopt a scheme in which two load cells 19 are respectively arranged between two brake springs 13 and two brake arms 10.

As shown in FIG. 1, controller 5 has operation control part 5*a* that controls driving of motor 3 and solenoid unit 11, and pressing force computing part 5*b* that computes pressing force F of brake shoes 9 applied on brake wheel 8 based on the output signals of two load cells 19. Also shown in FIG. 1, the controller 5 has a judgment device, namely judgment part 5*c* that judges whether there is any issue with the electromagnetic brake 4 based on the output signal of pressing force computing part 5*b*, and pressing force storage part 5*d* that stores the pressing force computed with pressing force computing part 5*b*.

The judgment part 5*c* detects whether there is an issue with the electromagnetic brake 4 based on the pressing force F corresponding to the brake force of electromagnetic brake 4, and the signal of the judgment result can be sent via communication device 21 and communication line 22 to monitoring center 23 at a remote site. Also, in this embodiment, judgment of yes/no of an issue in the electromagnetic brake 4 is carried out by means of controller 5. However, other arrangements are possible. For example, the judgment device of electromagnetic brake 4 could be separate from controller 5 and either a stand-alone device or integrated into another component.

Figure 3:
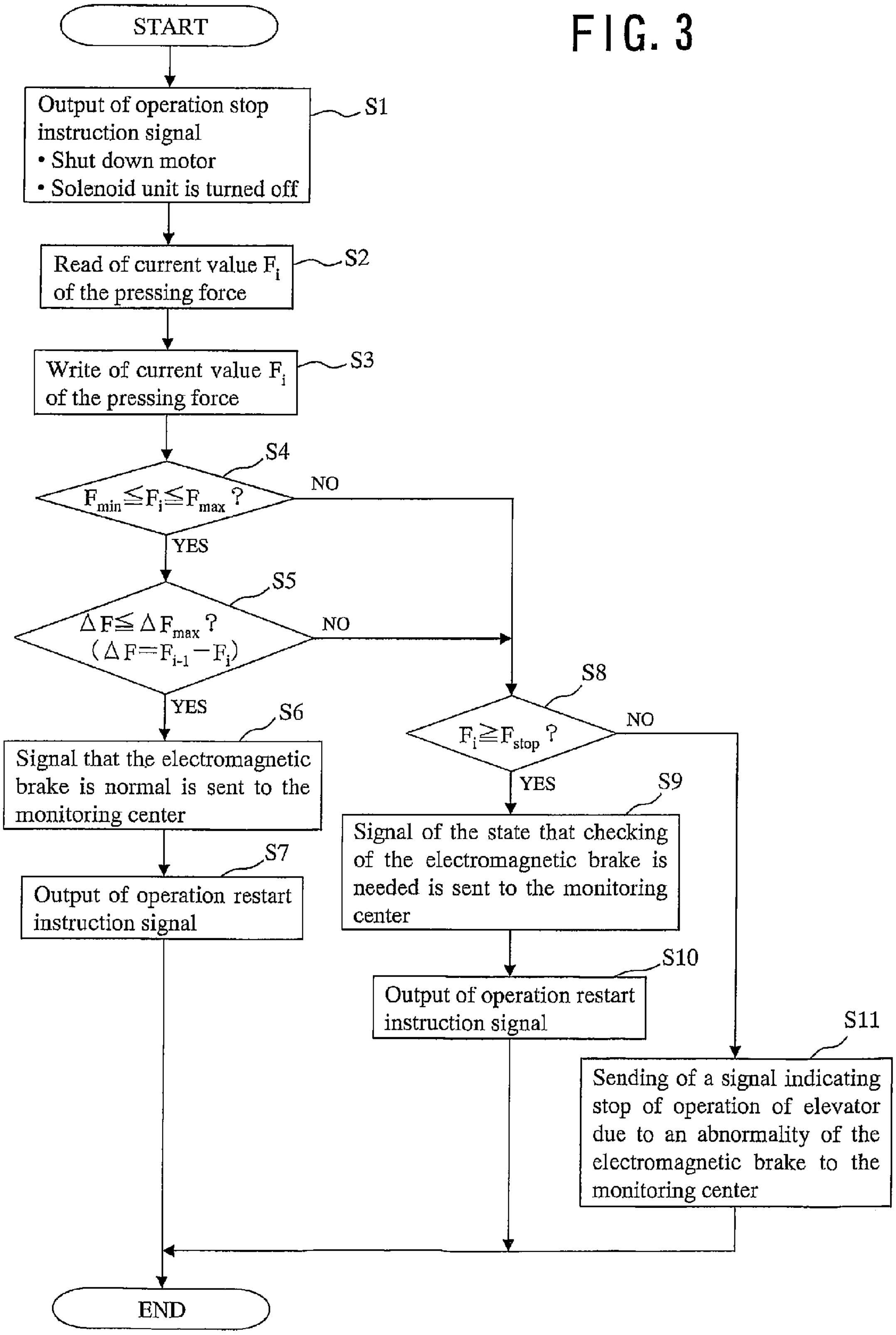
FIG. 3 is a flow chart illustrating the processing of the judgment part shown in FIG. 1.

FIG. 3 is a flow chart illustrating the processing of abnormality judgment part 5*c*. For the processing shown in FIG. 3, checking is executed each day at a prescribed checking start time, and the checking start time is set in a time period in which the frequency of use of the elevator is significantly lower in consideration of the purpose of use and location of the elevator.

As shown in FIG. 3, first, an operation stop instruction signal is output from abnormality judgment part 5*c* to operation control part 5*a*, and, when motor 3 is shut down, solenoid unit 11 is turned off, so that electromagnetic brake 4 is turned on (step S1). In this state, for pressing force F, current value $F_i$ of the pressing force is read from pressing force computing part 5*b* (step S2), and current value $F_i$ of the pressing force is written in pressing force storage part 5*d* (step S3).

Then, abnormality judgment part 5*c* judges whether the current value $F_i$ of the pressing force is above a prescribed normal judgment lower limit $F_{min}$ and lower than normal judgment upper limit $F_{max}$ (step S4).

If the judgment result of step S4 is YES, abnormality judgment part 5*c* reads the last round value $F_{i-1}$ of the pressing force previously written in pressing force storage part 5*d*, and it judges whether decrease quantity ΔF of the pressing force obtained by subtracting current value $F_i$ of the pressing force from the last round value $\mathbf{4}_{i-1}$ of the pressing force is smaller than a prescribed acceptable decrease quantity $\Delta F_{max}$ (step S5).

Here, the two linings 9*a* are worn off during use. When the two linings 9*a* are worn off, corresponding to the wear quantity, the compressive deformation quantity of two brake springs 13 in brake operation decreases, and the recovery forces of the two brake springs 13 decrease. Consequently, in step S5, by comparing decrease quantity ΔF over time and acceptable decrease quantity $\Delta F_{max}$, excessive wear of two linings 9*a* is judged.

When the judgment result in step S5 is YES, abnormality judgment part 5*c* outputs a signal indicating that electromagnetic brake 4 is normal via communication device 21 to monitoring center 23 (step S6), and it outputs an operation restart instruction signal to operation control part 5*a*, and the operation of the elevator is restarted (step S7), and the processing comes to an end.

On the other hand, when the judgment result in step S4 or S5 is NO, abnormality judgment part 5*c* judges that current value $F_i$ of the pressing force is higher than operation stop set value $F_{stop}$ preset at a value smaller than normal judgment lower limit $F_{min}$ (step S8).

When the judgment result in step S8 is YES, abnormality judgment part 5*c* sends a signal indicating that checking of electromagnetic brake 4 is needed as a first abnormality detection signal via communication device 21 to monitoring center 23 (step S9), which then outputs an operation restart instruction signal to operation control part 5*a* so that operation of the elevator is restarted (step S10). Then the operation comes to an end.

In this case, although current value $F_i$ of the pressing force is outside the normal range between normal judgment lower limit $F_{min}$ and normal judgment upper limit $F_{max}$, the abnormality is nevertheless not so critical that the operation of the elevator cannot be safely continued. Consequently, the service person can check electromagnetic brake 4 and take appropriate measures in the next round of service at a time that is convenient for the users of the elevator. Also, service portable terminal device 24 carried around by the service person for checking electromagnetic brake 4 can be connected to controller 5, and the value of the pressing force stored in pressing force storage part 5*d* can be checked via service portable terminal device 24 (see FIG. 1).

On the other hand, when the judgment result in step S8 is NO, a signal of a state of stop of operation of the elevator due to an abnormality of electromagnetic brake 4 is output as a second abnormality detection signal from abnormality judgment part 5*c* via communication line 22 to monitoring center 23 (step S11), and the processing comes to an end without restarting operation of the elevator.

That is, in this case, current value $F_i$ of the pressing force is very small, and operation of the elevator cannot be continued safely. Consequently, operation of the elevator is shut down, and a signal of this state is output to monitoring center 23, so that monitoring center 23 can promptly dispatch a service person to the elevator. Here, the dispatched service person takes appropriate measures, such as adjustment and exchange of parts of electromagnetic brake 4, to fix the elevator.

Consequently, in this embodiment, whether the brake force of electromagnetic brake 4 is appropriate can be quantitatively judged based on the recovery force detected by load cells 19, and the safety of the elevator is markedly improved. In addition, the checking operation need not be performed by the service person, so the checking operation can be carried out at high efficiency in a shorter time. In addition, an abnormality of electromagnetic brake 4 can be reliably detected independent of the skill of the service person.

If the abnormality of electromagnetic brake 4 is not critical and is of a relatively low level, the service operation for electromagnetic brake 4 can be carried out at a time that is convenient for the users of the elevator instead of shutting down the elevator immediately. As a result, the resentment of the users of the elevator can be reduced. On the other hand, if the abnormality of electromagnetic brake 4 is relatively serious, the elevator is shut down, and measures are taken to fix electromagnetic brake 4 to guarantee safety.

In addition, by judging whether there is excessive wear in linings 9*a* based on decrease quantity ΔF of the pressing force over time, an abnormality of electromagnetic brake 4 can be detected quickly. As a result, it is possible to further improve the safety of the elevator. This is also an advantage.

The invention claimed is:

1. A detector for an electromagnetic brake, while a brake force is generated by pressing a brake piece on a member for braking with the recovery force based on elastic deformation of a brake spring, said brake piece is driven away from the member for braking against the recovery force of said brake spring by means of an electromagnetic attracting force caused by excitation of a solenoid so that the brake force is released; the detector comprising:

a load sensor that detects the recovery force of said brake spring;

a judgment means that determines a condition of the electromagnetic brake based on the output of said load sensor;

wherein said judgment means determines whether the brake force of the electromagnetic brake is lower than a prescribed normal judgment lower limit or higher than a prescribed normal judgment upper limit based on the output of said load sensor, and, if the brake force of the electromagnetic brake is found to be lower than a prescribed normal judgment lower limit or higher than a prescribed normal judgment upper limit, a detection signal is output to a monitoring center; and wherein said detection signal is either:

a first detection signal sent to a monitoring center that the brake force of said electromagnetic brake is lower than said normal judgment lower limit and is higher than an operation stop value preset to be lower than said normal judgment lower limit, or if the brake force of said electromagnetic brake is higher than said acceptable upper limit, while operation of the elevator is continued, or a second detection signal sent to the monitoring center that the brake force of the electromagnetic brake is even lower than said operation stop preset value, said second detection signal indicating the state is output as said detection signal to the monitoring center, while operation of the elevator is turned off.

2. The detector of claim 1, wherein a brake arm is equipped with said brake piece that undergoes displacement toward/away from said member for braking when said solenoid is turned on/off, and there is a spring holding member that holds said brake spring in the space from said brake arm;

wherein a load cell for detecting the compressive load is arranged either between said brake holding member and the brake spring or between said brake arm and the brake spring.

3. The detector of claim 1, wherein said judgment means outputs said detection signal when the decrease in said brake force over time is larger than a prescribed acceptable decrease quantity.

4. A detector for an electromagnetic brake, comprising:

a sensor that outputs a signal indicative of a recovery force of said brake;

a judgment device connected to said sensor;

wherein said judgment device receives said signal from said sensor, makes a comparison of said signal from said sensor with at least one of a brake force lower limit or a brake force upper limit, and generates a signal indicative of said comparison to a monitoring center; and wherein said signal from said judgment device is either:

a first signal sent to a monitoring center that the brake force of said electromagnetic brake is lower than said normal judgment lower limit and is higher than an operation stop value preset to be lower than said normal judgment lower limit, or if the brake force of said electromagnetic brake is higher than said acceptable upper limit, while operation of the elevator is continued, or a second signal sent to the monitoring center that the brake force of the electromagnetic brake is even lower than said operation stop preset value, said second detection signal indicating the state is output as said detection signal to the monitoring center, while operation of the elevator is turned off.

5. The detector of claim 4, wherein said judgment device determines when the decrease in said brake force over time is larger than a prescribed acceptable decrease quantity.

6. The detector of claim 4, wherein said sensor is a load sensor.

7. An electromagnetic brake, comprising:

a brake piece for engaging a moveable member;

a brake spring for urging said brake piece against said moveable member with a recovery force;

a solenoid for urging said brake piece away from said moveable member;

a sensor that outputs a signal indicative of said recovery force;

a judgment device connected to said sensor;

wherein said judgment device receives said signal from said sensor, makes a comparison of said signal from said sensor with at least one of a brake force lower limit or a brake force upper limit, and generates a signal indicative of said comparison to a monitoring center; and wherein said signal from said judgment device is either:

a first signal sent to a monitoring center that the brake force of said electromagnetic brake is lower than said normal judgment lower limit and is higher than an operation stop value preset to be lower than said normal judgment lower limit, or if the brake force of said electromagnetic brake is higher than said acceptable upper limit, while operation of the elevator is continued, or a second signal sent to the monitoring center that the brake force of the electromagnetic brake is even lower than said operation stop preset value, said second detection signal indicating the state is output as said detection signal to the monitoring center, while operation of the elevator is turned off.

8. The brake of claim 7, wherein said judgment device determines when the decrease in said recovery force over time is larger than a prescribed acceptable decrease quantity.

9. The brake of claim 7, wherein said sensor is a load sensor.

10. A detector for an electromagnetic brake, while a brake force is generated by pressing a brake piece on a member for braking with the recovery force based on elastic deformation of a brake spring, said brake piece is driven away from the member for braking against the recovery force of said brake spring by means of an electromagnetic attracting force caused by excitation of a solenoid so that the brake force is released; the detector comprising:

a load sensor that detects the recovery force of said brake spring, a judgment means that receives a signal from the load sensor indicative of the recovery force and determines a condition of the electromagnetic brake based on the recovery force;

wherein said judgment means determines whether the brake force of the electromagnetic brake is lower than a prescribed normal judgment lower limit or higher than a prescribed normal judgment upper limit based on the recovery force, and, if the brake force of the electromagnetic brake is found to be lower than a prescribed normal judgment lower limit or higher than a prescribed normal judgment upper limit, a detection signal is output to a monitoring center, wherein said judgment means outputs said detection signal when a difference between a current brake force of the electromagnetic brake and an immediately prior measured brake force of the electromagnetic brake is larger than an acceptable decrease over time in brake force of the electromagnetic brake.

* * * * *